United States Patent [19]

Scheurs

[11] Patent Number: 5,003,395
[45] Date of Patent: Mar. 26, 1991

[54] SATELLITE RECEIVER HAVING AN INDEPENDENT ACTIVE ENERGY DISPERSAL SIGNAL GENERATOR

[75] Inventor: Louis P. M. Scheurs, Eindhoven, Netherlands

[73] Assignee: U.S. Philips Corporation, New York, N.Y.

[21] Appl. No.: 414,038

[22] Filed: Sep. 28, 1989

[30] Foreign Application Priority Data

Oct. 26, 1988 [NL] Netherlands .......................... 8802633

[51] Int. Cl.$^5$ .......................... H04N 5/44; H04N 5/46; H04N 5/213
[52] U.S. Cl. .................................... 358/188; 358/167; 358/189
[58] Field of Search ............... 358/181, 188, 142, 167, 358/189

[56] References Cited

U.S. PATENT DOCUMENTS

| | | | |
|---|---|---|---|
| 4,281,348 | 7/1981 | Shizuya | 358/188 |
| 4,605,968 | 8/1986 | Hayashi | 358/188 |
| 4,691,236 | 9/1987 | Kanno et al. | 358/189 |
| 4,698,598 | 10/1987 | Mobley et al. | 358/167 |
| 4,761,827 | 8/1988 | Horton et al. | 358/181 |
| 4,821,120 | 4/1989 | Tomlinson | 358/167 |

*Primary Examiner*—John K. Peng
*Attorney, Agent, or Firm*—Edward W. Goodman

[57] ABSTRACT

In a satellite receiver for a sum signal of a television signal and an energy dispersal signal, the sum signal being frequency-modulated on a carrier, the satellite receiver including a frequency demodulator (5) for obtaining a demodulated sum signal, a television signal processing circuit (8) including a decoding circuit (21) and a compensation circuit (17) which is synchronizable with the television signal to obtain the television signal from the sum signal, the compensation circuit (17) includes an active energy dispersal signal generator for obtaining the energy dispersal signal independently of the amplitude of the demodulated sum signal, the active energy dispersal signal generator having a synchronizing signal input (19) for applying a picture-frequency synchronizing signal thereto.

4 Claims, 1 Drawing Sheet

SATELLITE RECEIVER HAVING AN INDEPENDENT ACTIVE ENERGY DISPERSAL SIGNAL GENERATOR

BACKGROUND OF THE INVENTION

1. Field of the Invention

The invention relates to a satellite receiver for a sum signal of a television signal and an energy dispersal signal, said sum signal being frequency-modulated on a carrier, the satellite receiver comprising a frequency demodulator for obtaining a demodulated sum signal, a television signal processing circuit including a decoding circuit and a compensation circuit which is synchronizable with the television signal to obtain the television signal from the sum signal, an input of the frequency demodulator being coupled to an input of the satellite receiver and an output of the frequency demodulator being coupled to an input of the television signal processing circuit.

The invention also relates to a television signal processing circuit suitable for the satellite receiver.

2. Description of Related Art

A satellite receiver and a television signal processing circuit of these types are disclosed in the European Patent Application No. EP-A 0,235,587. With a view to possible interference on earth, an energy dispersal signal is added to television signals transmitted over DBS (Direct Broadcasting Satellite) satellites, in a transmitter for frequency modulation. If not compensated for, this energy dispersal signal will produce unwanted luminance variations and interferences in the synchronization in a satellite television receiver. Therefore, in the prior art satellite receiver, synchronizing signal peaks in the received and demodulated sum signal of the television signal and the energy dispersal signal are sampled during line retrace periods, whereafter samples obtained thereby are stored in a memory to obtain from these samples, with the aid of an integrator, an analog control voltage which is thereafter subtracted from the received sum signal. Since in MAC television transmission systems the horizontal deflection is not synchronized with the aid of line synchronizing pulses and, in addition, the clamping periods in these MAC television transmission systems are much shorter than in the television transmission systems which have been known already for a longer time, for example PAL, SECAM or NTSC, this prior art method is not suitable for MAC video signals. MAC is an abbreviation of "multiplexed analog components"; in a MAC television transmission system, analog luminance and chrominance signals are transmitted in time-division multiplex.

SUMMARY OF THE INVENTION

The invention has for its object to provide a satellite receiver and a television signal processing circuit suitable for MAC-signals.

According to the invention, a satellite receiver of the type disclosed in the opening paragraph, is characterized in that, the compensation circuit includes an active energy dispersal signal generator for obtaining the energy dispersal signal independently of the amplitude of the demodulated sum signal, the active energy dispersal signal generator having a synchronizing signal input for receiving a synchronizing signal of the picture frequency.

The invention is based on the recognition that all of the properties of the energy dispersal signal are laid down in a relevant television transmission system standard, so that it is not necessary to obtain this energy dispersal signal as described above from the received television signal, but said signal can also be obtained with the aid of an active energy dispersal signal generator operating in accordance with this standard, it then only being necessary to synchronize the generated energy dispersal signal with the television signal. It will be obvious that it is a condition for proper operation of the satellite receiver according to the invention that the energy dispersal signal is synchronized in the transmitter with the television signal. This is inter alia the case with television transmission systems of the MAC-packet family, for example the D2-MAC television transmission system.

An output signal of the active energy dispersal signal generator can be used in diverse positions in the satellite receiver to compensate for the energy dispersal signal added in the transmitter. Thus, this output signal can, for example, be added to (or subtracted from) a feedback signal of an automatic frequency control loop in the frequency demodulator.

A satellite receiver including an active energy dispersal signal generator according to the invention having a very low complexity and consequently a low cost price, is characterized in that the active energy dispersal signal generator comprises a programmable logic array sequencer.

A further simple satellite receiver is characterized, in that the active energy dispersal signal generator comprises a line counter circuit and a memory circuit, the line counter circuit having an incrementing signal input for applying thereto a synchronizing signal of the line frequency, a reset input for applying thereto a synchronizing signal of the picture frequency and an output coupled to an input of the memory circuit, the memory circuit, depending on a position of the line counter circuit, supplying an output signal corresponding to the energy dispersal signal.

A further elaboration thereof is characterized, in that the line counter circuit in the active energy dispersal signal generator coincides with a line counter circuit in the decoder circuit. This provides an optimum coherence between the decoder circuit and the active energy dispersal signal generator.

A further embodiment of a satellite receiver according to the invention is characterized, in that the compensation circuit also includes a subtracting circuit, having a first input coupled to an output of the active energy dispersal signal generator, a second input coupled to an output of an automatic gain control circuit and an output coupled to an input of the decoder circuit. In this embodiment, the energy dispersal signal is directly subtracted from the demodulated and amplitude-corrected television signal.

Preferably, the compensation circuit with the decoder circuit is incorporated in the same (integrated) television signal processing circuit.

BRIEF DESCRIPTION OF THE DRAWING

The invention will now be described by way of non-limitative example in greater detail with reference to the accompanying drawing, in which.

DESCRIPTION OF THE PREFERRED EMBODIMENT

Figure 1:
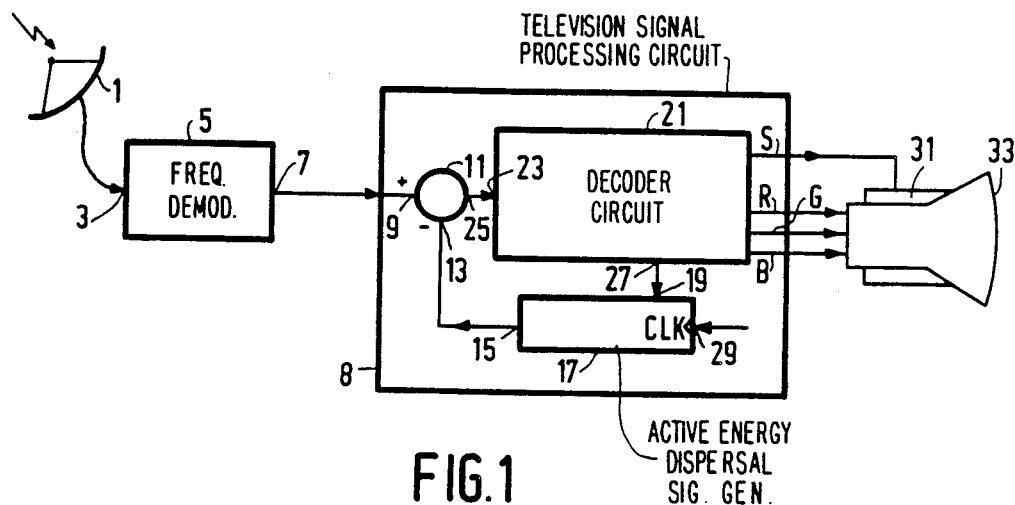
FIG. 1 is a block circuit diagram of a satellite receiver according to the invention.

In FIG. 1 a satellite signal receiver arrangement 1 is connected to an input 3 of a frequency demodulator 5. A carrier-modulated sum signal of a television signal and an energy dispersal signal is applied to the input 3. In view of possible interferences on earth, an energy dispersal signal is added in a transmitter for frequency modulation to television signals which are transmitted via DBS satellites. An output 7 of the frequency demodulator 5 is connected to an input of a television signal processing circuit 8, this input being constituted by a first input 9 of a subtractor circuit 11. The subtractor circuit 11 may, for example, comprise a differential amplifier. A second input 13 of the subtractor circuit 11 is connected, for the purpose of subtracting the energy dispersal signal from the sum signal, to an output 15 of an active energy dispersal signal generator 17, to a synchronizing signal input 19 of which a synchronizing signal of the picture frequency is applied for synchronizing the energy dispersal signal generated in the satellite receiver by the active energy dispersal signal generator 17, with the energy dispersal signal added to the television signal by the transmitter. The picture-frequency synchronizing signal can be obtained by means of prior art methods from the received signal in a decoder circuit 21. In, for example, the C-MAC, D-MAC or D2-MAC television transmission system, a picture synchronizing word is transmitted once in every picture in line 625. From this word, a picture-frequency synchronizing signal can be obtained to synchronize the energy dispersal signal which is generated by the active energy dispersal signal generator 17 and also has the picture frequency. It is alternatively possible to obtain a picture-frequency synchronizing signal from line synchronizing words of a television signal in accordance with these MAC systems, since the line synchronizing words which usually are inverted line-sequentially are not inverted twice at the end of each picture at the last four lines. From this deviating sequence of line synchronizing words, it is consequently also possible to obtain a picture-frequency synchronizing signal for the active energy dispersal signal generator 17. The decoder circuit 21 has an input 23 which is connected to an output 25 of the subtractor circuit 11 and an output 27 connected to the synchronizing signal input 19 of the active energy dispersal signal generator 17. In addition, the decoder circuit 21 also has an output S for applying a synchronizing signal to deflection means 31 of a display device 33, and also three outputs R, G and B for applying a red, green and blue picture signals, respectively, to the display device 33, the outputs S, R, G and B also constituting outputs of the television signal processing circuit 8.

The active energy dispersal signal generator 17 may be provided with a programmable logic array sequencer which, for consecutive clock pulses applied to a clock signal input (CLK) 29 of the active energy dispersal signal generator 17, supplies consecutive values of the energy dispersal signal. As all the properties of the energy dispersal signal are laid down in a relevant television transmission system standard, it is possible to program with the aid thereof the programmable logic array sequencer in a simple manner. For example, a line-frequency synchronizing signal or a clock signal obtained from a system clock of digitally structured portions of the satellite receiver can be applied to the clock signal input 29.

Figure 2:
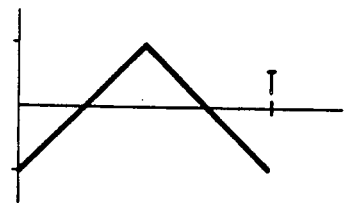
FIG. 2 shows a picture period of an energy dispersal signal.

FIG. 2 shows a picture period of an energy dispersal signal, in which the amplitude is plotted versus time. With 50 Hz television transmission systems such as PAL, SECAM and the European MAC-systems, a duration T of this picture period is equal to 40 ms, and with 60 Hz television transmission systems such as NTSC and MUSE this duration T is equal to 33.3 ms. In, for example, the D2-MAC television transmission system, the addition to the energy dispersal signal in the transmitter causes a deviation of 600 kHz peak-peak in the carrier frequency, a reduction of 380 kHz in the carrier frequency being caused at the beginning of the first line of each picture.

Figure 3:
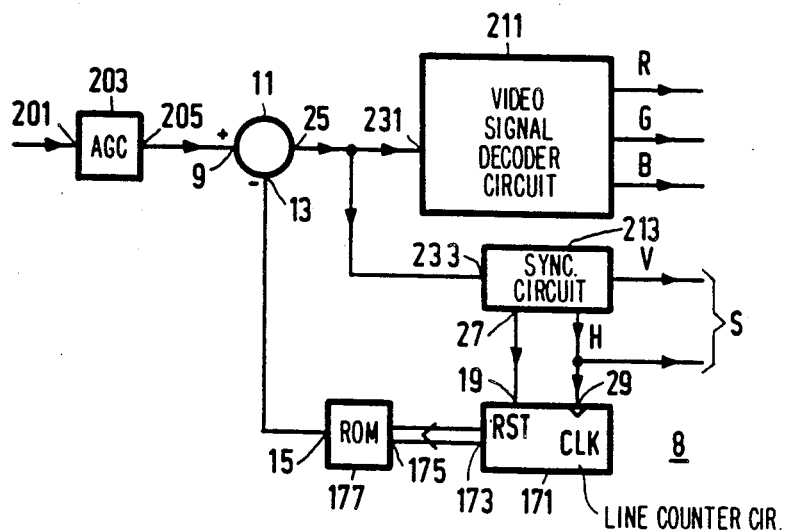
FIG. 3 is a more detailed block circuit diagram of a television signal processing circuit including a decoder circuit and a compensation circuit suitable for a satellite receiver according to the invention.

FIG. 3 is a more detailed block circuit diagram of a television signal processing circuit including a decoder circuit and a compensation circuit suitable for a satellite receiver according to the invention, in which portions corresponding to those in FIG. 1 are given the same reference numerals as in FIG. 1. In FIG. 3, the demodulated sum signal obtained from the frequency demodulator 5 of FIG. 1 is applied to an input 201 of an automatic gain control circuit 203. An output 205 of the automatic gain control circuit 203 is connected to the first input 9 of the subtractor circuit 11. The automatic gain control circuit 203 adjusts the maximum amplitude of the demodulated sum signal to a maximum laid down in the television transmission system standard, so that the generated energy dispersal signal can be subtracted in a simple manner directly from the sum signal by the subtractor circuit 11. The output 25 of the subtractor circuit 11 is connected to an input 231 of a video signal decoder circuit 211 and to an input 233 of a synchronizing circuit 213. The inputs 231 and 233 constitute together the input 23 of the decoder circuit 21 of FIG. 1. The synchronizing circuit 213 has an output V for supplying a field-frequency synchronizing signal, an output H for supplying the line-frequency synchronizing signal and also the output 27 for supplying the picture-frequency synchronizing signal. The outputs V and H of the synchronizing circuit 213 together constitute the output S of the decoder circuit 21 of FIG. 1. The outputs H and 27 of the synchronizing circuit 213 are connected to the clock signal input (CLK) and to a reset input (RST) 19, respectively, of a line counter circuit 171. The line counter circuit 171 forms, together with a read-only memory 177, the active energy dispersal signal generator 17 of FIG. 1. An output combination 173 of the line counter circuit 171 is connected to an address input combination 175 of the read-only memory 177. An output of the read-only memory 177 forms the output 15 of the active energy dispersal generator 17 and is connected to the second input 13 of the subtractor circuit 11. At the beginning of each picture, the line counter circuit 171 is reset to zero by means of a pulse of the picture-frequency synchronizing signal at the resetting input (RST) 19. At each pulse of the line-frequency synchronizing signal at the clock signal input (CLK) 29, the position of the line counter circuit 171 is incremented by one, this position serving as the address for the read-only memory 177. Depending on this address, the read-only memory 177 supplies an output signal corresponding to the energy dispersal signal from the output 15. In television signal processing circuits suitable for a television transmission system of the MAC-packet family, a line counter circuit has usually already been provided for other purposes. By having that line counter circuit coincide with the line counter circuit 171, a savings in components can be accomplished. The television signal processing circuit shown in FIG. 3, having the video signal decoding circuit 211, the synchronizing circuit 213 and the compensation circuit 171, 177, can be constituted in a simple manner by one integrated circuit.

No analog-to-digital and digital-to-analog converters are included in the above description. It will be obvious that such converters must be provided between analog and digital portions of the circuit, where necessary, in combination with suitably selected filters. The choice which portions of the circuits will be designed as analog portions and which portions as digital portions, is however a matter of design and is therefore not described. During reading of the present description, numerous variations will be obvious for a person skilled in the art. All these variations are considered to be part of the scope of the invention.

I claim:

1. A satellite receiver for a sum signal of a television signal and an energy dispersal signal, said sum signal being frequency-modulated on a carrier, the satellite receiver comprising a frequency demodulator for obtaining a demodulated sum signal, a television signal processing circuit including a decoding circuit and a compensation circuit which is synchronizable with the television signal to obtain the television signal from the sum signal, an input of the frequency demodulator being coupled to an input of the satellite receiver and an output of the frequency demodulator being coupled to an input of the television signal processing circuit, characterized in that the compensation circuit includes an active energy dispersal signal generator for obtaining the energy dispersal signal independently of the amplitude of the demodulated sum signal, the active energy dispersal signal generator having a synchronizing signal input for receiving a synchronizing signal of the picture frequency.

2. A satellite receiver as claimed in claim 1, characterized in that the active energy dispersal signal generator includes a programmable logic array sequencer.

3. A satellite receiver as claimed in claim 1, characterized in that the active energy dispersal signal generator includes a line counter circuit and a memory circuit, the line counter circuit having an incrementing input for applying a line-frequency synchronizing signal thereto, a reset input for applying thereto a picture-frequency synchronizing signal and an output coupled to an input of the memory circuit, the memory circuit, in dependence on a position of the line counter circuit supplying an output signal corresponding to the energy dispersal signal.

4. A satellite receiver as claimed in claim 1, 2 or 3 characterized in that the compensation circuit further includes a subtractor circuit having a first input coupled to an output of the active energy dispersal signal generator, a second input coupled to an output of an automatic gain control circuit and an output coupled to an input of the decoding circuit.

* * * * *